Oct. 4, 1955  E. P. HARRIS  2,719,343
FLEXIBLE SEALING STRIP
Filed Nov. 24, 1951  2 Sheets-Sheet 1

INVENTOR.
EDWARD P. HARRIS
BY
*Willets Henderson & John*
his ATTORNEYS

Oct. 4, 1955        E. P. HARRIS        2,719,343

FLEXIBLE SEALING STRIP

Filed Nov. 24, 1951        2 Sheets-Sheet 2

INVENTOR.
EDWARD P. HARRIS
BY
HIS ATTORNEYS

United States Patent Office 2,719,343
Patented Oct. 4, 1955

2,719,343

FLEXIBLE SEALING STRIP

Edward P. Harris, Dayton, Ohio, assignor to General Motors Corporation, Detroit, Mich., a corporation of Delaware Application November 24, 1951, Serial No. 258,045

2 Claims. (Cl. 20—69)

This invention relates to wire reinforced flexible rubber-like sealing strips adapted for use with automotive vehicle doors and the like to provide a weathertight seal around the door opening.

In my copending application, Serial No. 164,738, filed May 27, 1950, which became Patent No. 2,579,072 on December 18, 1951, a similar type of sealing strip is shown and disclosed which includes a flexible wire reinforcement in the rubber-like strip that is of a zig-zag formation, thereby providing for longitudinal extensibility of the strip as a whole so that the strip may be assembled to a door by snapping attachment lugs formed integral with the reinforcing wire into holes or apertures in the door. The exact spacing between these apertures is not of any great importance due to the fact that the wire reinforcement, being of zig-zag character, permits extensibility thereof whereby the strip may be stretched or slightly compressed to permit attachment.

This invention is directed to an improvement over the strip disclosed in my application, Serial No. 164,738, which became Patent No. 2,579,072 on December 18, 1951, in that a body of deformable rubber-like material formed integral with the strip is provided around each attachment point, which body of rubber-like material seals with the door when the strip is assembled thereto to seal around the apertures in the door whereby the ingress of water, air, snow, etc., through the attachment apertures normally present in the door, is prevented.

It is therefore the object of this invention to provide a wire reinforced laterally extensible rubber-like sealing strip which is adapted for attachment to a door or the like through apertures or lugs associated therewith wherein portions of rubber-like material, formed integral with the strip adjacent and surrounding each of the attachment points, are provided for sealing the door apertures at the points of attachment.

Further objects and advantages of the present invention will be apparent from the following description, reference being had to the accompanying drawings, wherein preferred embodiments of the present invention are clearly shown.

In my copending application, Serial No. 164,738, which became Patent No. 2,579,072, on December 18, 1951, an embodiment of an improved sealing strip is shown which is attached by means of clips preferably formed integral with the wire reinforcement therein which pass through and snap into apertures in a door panel. It has been found that, in some instances, where extreme weather conditions are present, driving rain or high wind, etc., may enter through the apertures and thereby pass within the door panel. While this condition is not always prevalent, it has been found to be desirable to eliminate the condition entirely and the present invention is directed towards the accomplishment of this end.

Figure 1:
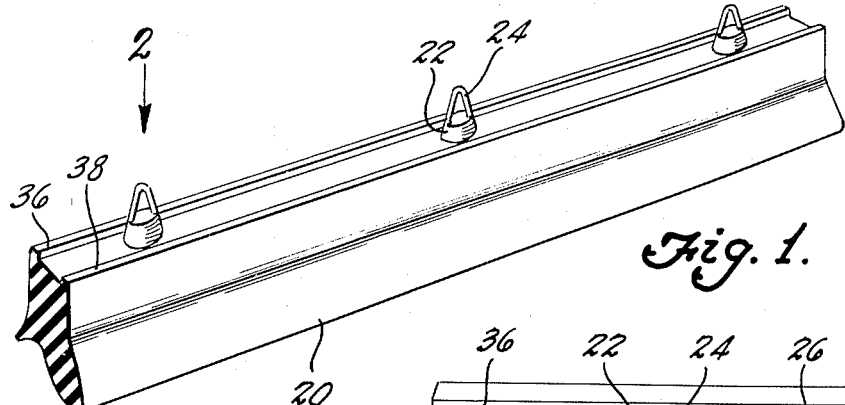
Fig. 1 is a view in perspective of one embodiment of my improved sealing strip.
Figure 2:
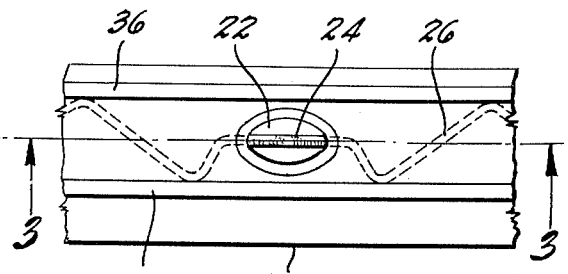
Fig. 2 is a view on an enlarged scale taken in the direction of arrow 2 in Fig. 1, showing the top view of one of the attachment lugs or clips.
Figure 5:
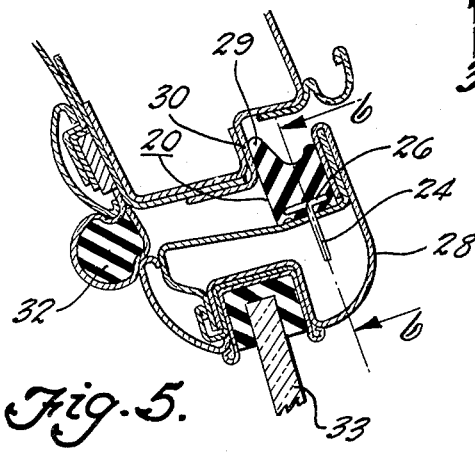
Fig. 5 is a view in section of a portion of an automobile body and door, showing the strip in place.
Figure 3:
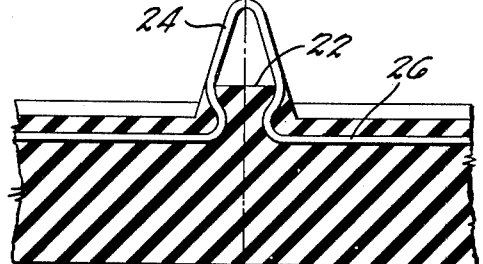
Fig. 3 is a view in section taken on line 3—3 of Fig. 2, showing the wire reinforcement and an attachment clip.

The sealing strip shown at 20 in Fig. 1 is substantially the same as that noted in my aforementioned application with the exception that a protuberance 22 is molded around the base of each of the clips 24. The protuberance 22 is upstanding from the main portion of the strip 20 and is integral therewith and extends part way up each clip 24. The clips are portions of a zig-zag wire 26 which is embedded in the strip and these same clips 24 act as attachment means for attaching the strip 20 to a door panel 28 as shown in Fig. 5. It will be noted in Fig. 5 that a flexible sealing lip 29 of the strip 20 seals against body portion 30 which is sealed at the other side thereof to the door by a conventional windlace cord 32. The door 28 usually carries a window 33 therein.

Figure 6:
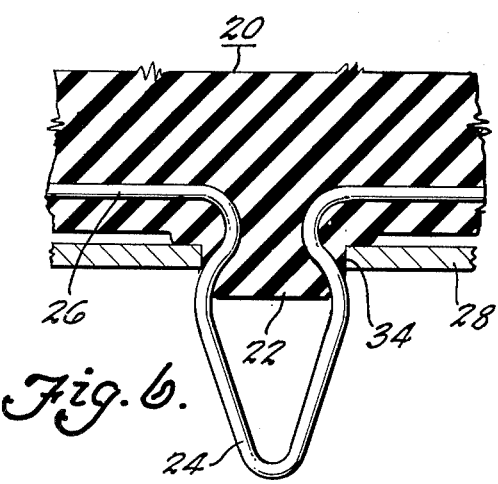
Fig. 6 is an enlarged view in section taken on line 6—6 of Fig. 5.
Figure 4:
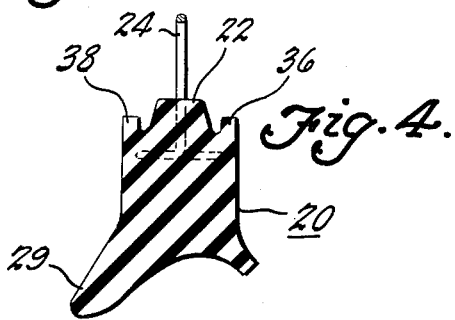
Fig. 4 is a view in section taken on line 4—4 of Fig. 3, showing a cross section of the strip.

Studying in detail the use of protuberance 22, it will be noted in Fig. 6 that the door 28 includes a plurality of aligned apertures 34 therethrough into which the clips 24 pass and engage due to their springy character. The protuberance 22 is of resilient, rubber-like material which extends up the clip 24 and is forced into the aperture 34 to completely seal the same when the clip is in engaging position. In this manner, the apertures 34 along the door 28 which are used to receive the connecting means or clips 24 of the strip 20 are each sealed against ingress of water, air, etc. It will be noted that the cross section of strip 20, shown in Fig. 4, includes longitudinally extending resilient side ridges 36 and 38 thereon which aid in the sealing. In each case, however, the protuberance or outstanding sealing nub 22 extends above the ridges 36 and 38.

Figure 7:
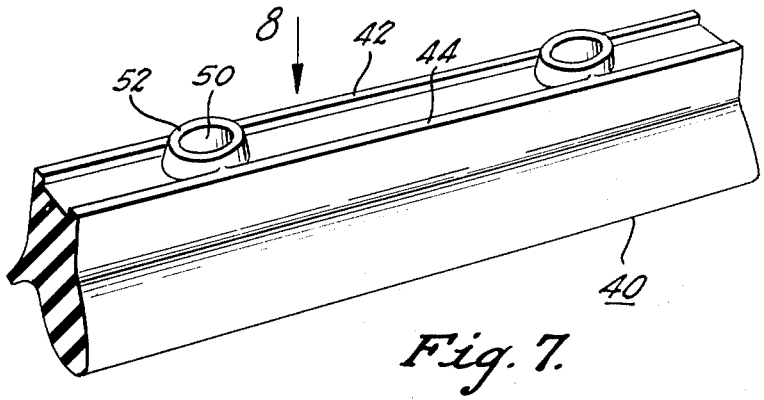
Fig. 7 is a view in perspective of another embodiment of sealing strip.
Figure 8:
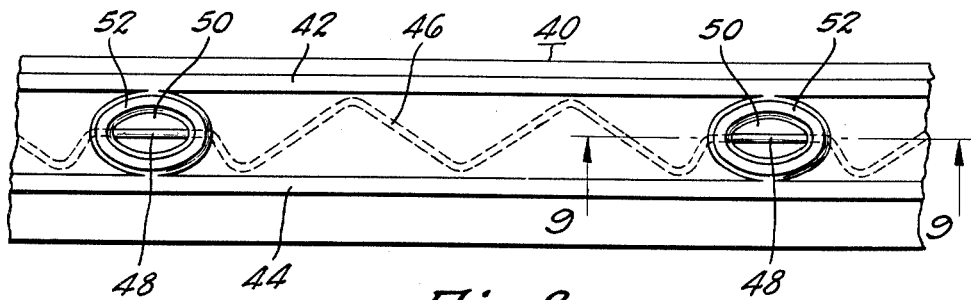
Fig. 8 is a top view of the clip shown in Fig. 7 on an enlarged scale taken in the direction of arrow marked 8.
Figures 9, 10:
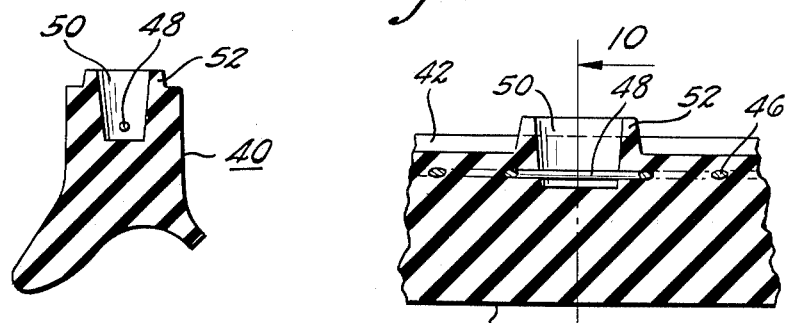
Fig. 9 is a view in section taken on line 9—9 of Fig. 8.
Fig. 10 is a view in section taken on line 10—10 of Fig. 9.

Referring to Fig. 7, another embodiment of the invention is shown wherein a sealing strip 40, having side ridges 42 and 44 thereon, is provided, which strip 40 includes a zig-zag wire reinforcement 46 molded therein. At spaced points along the length of the reinforcement 46, straight portions 48 are provided which are accessible from the outside of the strip due to the fact that rubber-like material of the strip 40 is not molded thereover. Thus, the straight portions 48 of reinforcement 46 presents an attachment point at each opening 50 of the sealing strip. Around each opening 50 is provided an upstanding integral protuberance 52. This protuberance 52 presents a collar around the recess or opening 50 in the strip and serves the same purpose as the protuberance 22 in the other embodiment of my invention.

Figure 11:
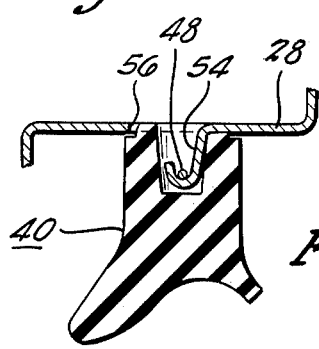
Fig. 11 is a fragmentary view in section, showing the sealing strip of Fig. 7 attached to a door, for example.

The door 28, a portion of which is shown in Fig. 11, includes a plurality of outwardly turned integral clips 54 therealong, one for each opening 50 in the strip. These clips extend upwardly from the door and engage the straight portions 48 of the zig-zag wire to hold the strip to the door. The collars or protuberances 52 compress around the apertures 56 formed by the punching out of the clips 54 and seal these apertures against ingress of any air or water.

Thus it will be noted that in both of the embodiments of the invention an integral protuberance of the rubber-like material integral with the strip is formed and provided around each said attachment points, said attachment points all being exteriorly accessible and that said protuberances seal the apertures in the door or other connected member as the case may be against ingress of air, water and the like.

The strips, as disclosed in this specification, are molded by conventional procedures and may be formed from any of the usual materials used in sealing strips. Preferably, foamed rubber-like material, is used which is highly compressible and resilient, provides an excellent seal. Natural rubbers, synthetic copolymers and plastics or compatible mixtures thereof, may all be used in the manufacture of the strip, the particular material therein being no part of my invention which is directed, in its entirety, to sealing means formed integral with the strip for sealing attachment apertures in a door panel or other object to which the strip is attached.

While the embodiments of the present invention as herein disclosed, constitute preferred forms, it is to be understood that other forms might be adopted.

What is claimed is as follows:

1. A flexible sealing strip adapted to be attached to a sheet metal member having a series of attachment clips therealong, said strip comprising a resilient elongate body of deformable rubber-like material, a continuous wire reinforcement embedded in said body, said reinforcement having a plurality of spaced exteriorly accessible attachment clips therealong adapted to cooperate with the attachment clips on said sheet metal member for holding the strip to the member, and a plurality of outstanding rubber-like sealing members disposed entirely around each of said attachment points and adapted to be compressed adjacent said attachment clips for sealing the strip to the sheet metal member at the points of attachment.

2. A flexible, extensible sealing strip adapted to be attached to a sheet metal member having a plurality of outwardly extending attachment clips therealong, said strip comprising a resilient elongate extensible body of deformable rubber-like material, a continuous wire reinforcement of zig-zag shape embedded in said body, said body including a plurality of spaced openings along one surface thereof exposing portions of said wire whereby said clips may be inserted in said openings for engaging said portions of wire for holding the strip to the sheet metal member.

References Cited in the file of this patent

UNITED STATES PATENTS

| | | |
|---|---|---|
| 2,161,648 | Widman | June 6, 1939 |
| 2,455,669 | Gagnier | Dec. 7, 1948 |
| 2,579,072 | Harris | Dec. 18, 1951 |
| 2,601,512 | Gagnier | June 24, 1952 |